(No Model.) 2 Sheets—Sheet 1.
M. VAN MATTESON.
HARVESTER RAKE.

No. 313,135. Patented Mar. 3, 1885.

Witnesses:
E. J. Asmus
Adolph Klein

Inventor
Marse Van Matteson
By
Stout & Underwood,
Attorneys.

(No Model.) 2 Sheets—Sheet 2.

M. VAN MATTESON.
HARVESTER RAKE.

No. 313,135. Patented Mar. 3, 1885.

Witnesses:
E. J. Asmus
Adolph Klein

Inventor:
Marse Van Matteson
By
Stout & Underwood
Attorneys.

UNITED STATES PATENT OFFICE.

MARSE VAN MATTESON, OF MILWAUKEE, WISCONSIN.

HARVESTER-RAKE.

SPECIFICATION forming part of Letters Patent No. 313,135, dated March 3, 1885.

Application filed March 16, 1883. (No model.)

*To all whom it may concern:*

Be it known that I, MARSE VAN MATTESON, of Milwaukee, in the county of Milwaukee and State of Wisconsin, have invented certain new and useful Improvements in Harvester-Rakes; and I do hereby declare that the following is a full, clear, and exact description thereof.

My invention consists in certain peculiarities of construction, as will be more fully set forth hereinafter.

Figure 1:
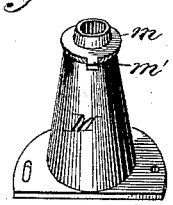
Figure 2:
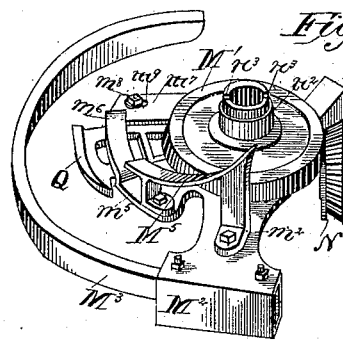
Figure 5:
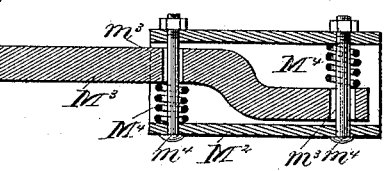
Figure 3:
Figure 4:
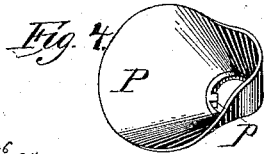
Figure 6:
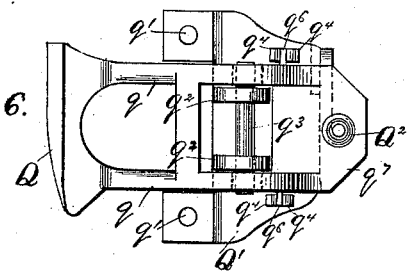
Figure 7:
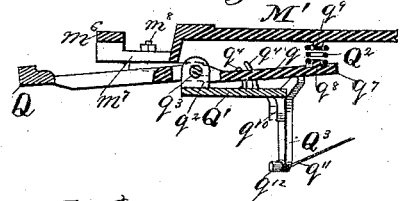
Figure 8:
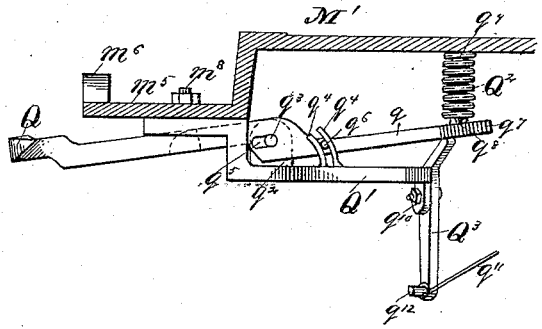
Figure 9:
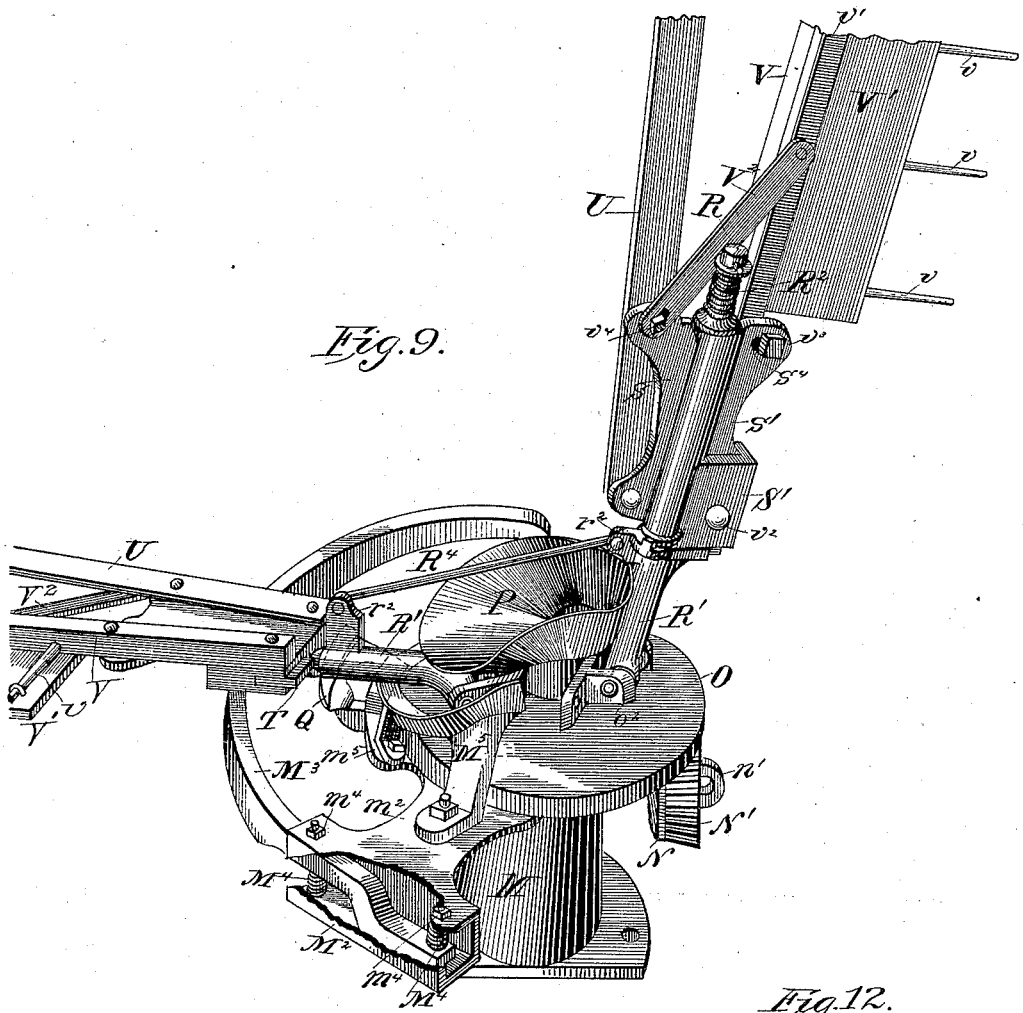
Figure 13:
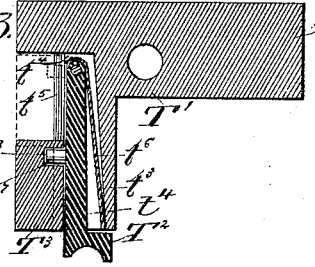

In the drawings, Figure 1 is a perspective view of the rake post or standard. Fig. 2 is a perspective view of the rake-plate and attachments. Fig. 3 is a perspective view of the bevel rake-wheel on a reduced scale. Fig. 4 is a perspective view of the cap or cam. Fig. 5 is a sectional view of a portion of the rake-rail. Fig. 6 is a plan view of the rake-trip. Figs. 7 and 8 are vertical sectional views of said trip. Fig. 9 is a perspective view of the rake, showing two of the rakes in position. Fig. 10 is a perspective view of one of the rake-arms. Fig. 11 is a perspective view of one of the rake-arm sleeves with the rigid dog attached. Fig. 12 is a perspective view of a rake-arm sleeve with movable dog attached; and Fig. 13 is a vertical section, on an enlarged scale, of said dog.

M is a hollow post or standard of general conical form, and adapted to be securely fastened by means of its flanged base to the platform of a harvesting-machine. The upper part of this post is provided with a circular flange, $m$, having two projecting lugs, $m'$, exactly opposite each other, while the top of the cone extends a short distance above the flange, and is truncated, as shown in the detail view, Fig. 1, the whole being cast in one piece.

M' is a plate of irregular shape, provided with a central hole, and adapted to fit over the top of the post M, the under side of said plate being provided with depressions to receive the flange $m$ and its lugs $m'$, and thus be securely locked thereon. This plate M' has a downward and outward projecting arm, $m^2$, ending in a box or housing, $M^2$, which receives one end of the rake rail or cam $M^3$. This rail is preferably a rigid curved bar, the inner end of which rests within the housing $M^2$, and is bent as shown in Fig. 5, and provided with the slots $m^3 m^3$, through which pass the bolts $m^4 m^4$, around which are the coiled springs $M^4 M^4$, one above and the other below the said rail, as shown.

From one side of the plate M', and from a strengthening-lug, $n$, cast therewith, there depends a flange, N, also integral with the plate, and which serves as the support of a beveled pinion, N', secured by means of thimble and bolt (not shown) to said flange; and the pinion is provided with ears $n' n'$, for attachment to one end of a tumbling-shaft (not shown) by means of ordinary knuckles, rings, and pins, the said tumbling-shaft being constructed with a clutch near its other end, where it is connected by knuckles, rings, and pins to the inner end of the axle of the main drive-wheel, all as well known in this class of machines. Around the central opening in the plate M' rises a collar, $n^2$, the upper part of which is of reduced external diameter, so as to form a circular shoulder, and this reduced part is provided with the notches $n^3 n^3$ to receive the rake cap or cam, as hereinafter described.

O is a horizontal bevel rake-wheel, having a central opening to enable it to be placed over the collar $n^2$ of the plate M' and rest on the plate M', and its cogs $o$ mesh with the pinion N', just described. The central opening of this wheel is encircled by a vertical collar, $o'$, from which extend the ears $o^2 o^2$, to which the rake-arms are pivoted, all the parts of this wheel O being integral.

P is the cap or cam of the rake-standard, of the general shape shown in Fig. 4. Its bottom is provided with an opening, and there has two inward projections, $p$, opposite each other, which, after the crown-wheel O has been mounted on the collar $n^2$ of the plate M', will fit into the notches $n^3$ of said collar. When all these parts have been put together, as shown in Fig. 9, a bolt is passed up through all from the under side of the platform, and a nut is screwed on this bolt above a washer in the cam P, thus securing all firmly together.

$M^5$ is a rake-guide, bolted, as shown, to the projecting portions $m^2 m^5$ of the plate M'; and $m^6$ is a continuation of the projection $m^5$, passing above the trip, and designed as a stop to limit the upward movement of said trip. The projection $m^5$ of the main plate M' has a nearly-radial straight edge, and opposite to this is the nearly-radial straight edge of another projection, $m^7$, of the said plate M', and between these edges the trip Q is located. This trip is supported by the trip-holder Q', which is fastened to the under side of the projections $m^5$ $m^7$ of the plate M' by bolts $m^8$ $m^8$ passing through holes $q'$ $q'$ in said holder Q' and through slots $m^9$ in the said projections, whereby the holder and trip may be adjusted in or out from the frame M'. This holder is provided with ears $q^2$ $q^2$, which are provided with holes to receive a shaft or pivot-pin, $q^3$, and the said holder has also cast therewith the curved guides $q^4$ $q^4$. The trip Q has two backward-extending arms, $q$ $q$, which have each a slot, $q^5$, through which the pivot $q^3$ passes, and these arms have the nipples $q^6$ cast thereon, which nipples are adapted to move between the curved guides $q^4$ $q^4$. At the rear or inner end of the trip Q the arms $q$ $q$ are united by a solid plate, $q^7$, provided with a nipple, $q^8$, and the under side of the plate M' is provided with a corresponding nipple, $q^9$, and between these two is sustained a stiff coiled spring, $Q^2$. From the under side of the trip-holder Q' there depends a lug, $q^{10}$, to which is pivoted a bell-crank, $Q^3$, the short arm of which bears against the under side of the part $q^7$ of the trip, and when the bell-crank is pulled by a trip-wire, $q^{11}$, attached to the pin $q^{12}$ at the end of the long arm of said bell-crank the said part $q^7$ is forced upward against the force of the spring $Q^2$, and the front end of said trip is thereby forced downward and forward. The other end of this trip-wire $q^{11}$ is connected to a lever (not shown) of ordinary construction within reach of the driver's foot.

The rake-arms consist of round steel rods R, cast within the metal shanks R', which latter are provided with the ears $r'$ $r'$, which fit between the ears $o^2$ $o^2$ on the rake-wheel O, and are secured thereto by bolts passing through holes in all these ears. The end of the shank R' farthest from the ears $r'$ is provided with the vertical lug $r^2$, the stop $r^3$, and the groove $r^4$.

S is the rake-arm sleeve, which is cast with plates $s$ $s'$ above and below, the plate $s$ having the hole $s^2$ and slot $s^3$, for attachment of the rake-slat U, while the lower plate, $s'$, has the slot $s^4$ in one end, and at the other end said plate is double, forming the housing S' for the dog T or T'. When this sleeve has been pushed onto the rod R, the spring $R^2$ is slipped on the rod, and then a washer, and then these parts are all secured together by a pin, $r$, driven through a hole near the extreme outer end of the said rod R.

In Fig. 9 I have shown only two rake-arms connected by the link $R^4$, the ends of which link are pivoted in the lugs $r^2$, already named; but it will be understood that in practice I use four rake-arms, the sleeves of three of which are furnished with the dogs T, (shown in Fig. 11,) while the sleeve of the fourth rake-arm (being the one that rakes automatically) is furnished with the dog T'. (Shown in Figs. 12 and 13.) The dog T is a simple tongue or plate of metal, preferably independent of the housing S', and sustained rigidly therein by a bolt, as shown; but the dog T' is of more complicated construction, and consists of the shank $t'$, the projecting end $t^2$ of which is of less depth than said shank, and said shank has a downward projection, $t^3$, provided with a central vertical recess, $t^4$, the outer edge of which is provided with dovetailed or beveled grooves, as shown at $t^5$.

$T^2$ is a thumb-piece pivoted within said recess, and having a spring, $T^6$, attached to its upper end, and located between said thumb-piece and the rear wall of said recess $t^4$. The front of this thumb-piece bears a pin, $t^7$, at about its center, and this pin (when the parts are in the position shown in the drawings) fits within a groove or mortise, $t^8$, in the dog-block $T^3$, the inner edges of the vertical sides of which block are beveled to form a dovetail to fit within the vertical grooves $t^5$, already described. In this position the trip Q will pass between the projection $t^2$ and the block $T^3$ without effect; but if it is desired to make the dog T' operate like the dogs T it is only necessary to press back the thumb-piece $T^2$ against the force of the spring $t^6$ and push the block $T^3$ up against the under side of the projection $t^2$, (as shown in dotted lines in Fig. 13,) when, by releasing the thumb-piece, the spring $t^6$ will force it out again, and then the pin $t^7$ will rest underneath and support the block $T^3$, thereby making a solid dog of it.

V is a wooden tapered beam, which forms the top of the rake, through which the teeth $v$ $v$ are inserted. A board, V', is placed on these teeth, extending the entire length of the rake, and securely fastened to the said beam and to the teeth, and a metal strengthening-strap, $v'$, covers the point of junction of the beam and board. The inner end of the rake-beam V is pivoted on the bolt $v^2$, which secures the dog within the housing S' of the rake-arm sleeve, and another bolt, $v^3$, passes through the slot $s^4$ in said sleeve and through the beam, by means of which the said rake-beam is adjusted up or down. A brace, $V^2$, extends from the said beam to a bolt, $v^4$, passing through a slot in this end of the brace, then through the slot $s^3$ in the rake-arm sleeve, and thence through a hole in the rake-slat U, already described, whereby the described adjustment is made possible, and the outer ends (not shown) of the rake-slat U and tooth-beam V are braced together in the ordinary manner.

The operation of my rake and trip is substantially as follows: Power is communicated to the pinion N', through the described tumbling-shaft, from the axle of the drive-wheel of the harvester, (not shown,) and this pinion turns the rake-wheel O, and thus revolves the rake-arms attached thereto. The shanks R' bear against and are guided by the edge of the cam or cap P, the opposite rakes of each pair being united by the links R⁴, so that one rake will be going down as the other is rising in each pair.

In the normal position of my device three of the rakes act simply as reel-beaters. The raking operation is performed by the fourth rake. As the arm of each of the three rakes first named, in its journey round the cam P, is forced down upon the guide M⁵, its dog T, which is normally within the groove $r^4$ of the shank R′, will encounter the front of the trip Q, and will thus be forced out of said groove, the sleeve S being pushed outward on the rod R against the force of the spring R², and when the rake-sleeve is released from the shank of the rake-arm said sleeve will come in contact with the rail or cam M³, and will roll or turn as far as allowed by the stop $r^3$, so as to rest horizontally on said rail, and continue in this position while moving over the platform (the rake not disturbing the cut grain thereon) until the end of the rail is reached, and then the weight of the rake-beam V and attachments will cause these parts to assume their normal vertical position, and the spring R² will force the sleeve S back against the shank R′ of the rake-arm, and the dog T will enter the groove $r^4$ again, and remain rigidly therein until the trip Q is again encountered in the next revolution of the rake-head. But when the fourth rake approaches the trip Q the latter will pass, as already stated, between the projection $t^2$ and block T³ of the dog T′ without moving the sleeve S, and hence as the teeth of the rake will thus remain vertical they will sweep the grain off the platform, ready for binding, and by reason of the springs M⁴ M⁴, surrounding the bolts $m^4$ $m^4$ in the housing M², and the slots $m^3$ $m^3$ in the end of the rail M³, the said rail may be forced downward under the pressure of the edge of the sleeve of said fourth rake, and hence allow the vertical teeth to nearly or quite touch the platform, and thus insure that no grain be left thereon in the continued revolution of said rake. When the grain is so thin that there would not be sufficient on the platform to form a proper sized gavel with every revolution of the said fourth rake, or where (as in turning a corner) it is desirable to carry the cut grain some distance before raking it off, the driver can prevent this fourth rake from raking by drawing on the trip-wire $q^{11}$, attached to the bell-crank Q³, (which, as stated, may be done by an ordinary foot-lever, if desired,) when the front of the trip Q will be immediately depressed and thrown forward by the action of the parts shown in Figs. 7 and 8, and already described, and the said trip will then bear against the dog-block T³ of the dog T′ and force the sleeve S, to which this dog is rigidly attached, away from the shank R′, unlocking the projection $t^2$ of the dog T′ from the groove $r^4$ and permitting this rake to turn and ride on the rail M³, exactly like the other rakes. If the pressure on the bell-crank is now released, the spring Q² will restore the trip to its normal position, and there will be no raking off until this fourth rake has made another complete revolution; but if it is desired to rake off before this occurs, or cause any one of the rakes to act, the driver, by again drawing on the trip-wire $q^{11}$, will cause the front of the trip to be lowered, and it will pass under the next rigid dog, T, without freeing it from the groove in its rake-arm shank, and hence the rake will at once rake off the grain as it sweeps over the platform.

Whenever it is desired to size all the gavels, (as in fields where the grain is very uneven or either too high or too heavy to make proper-sized bundles by raking off with every fourth rake,) the block T³ of the dog T′ can be pushed up (as already described, and shown in dotted lines in Fig. 13) against the under side of the projection $t^2$, and rigidly held in such position by means of the pin $t^7$, and then the dogs in all the rake-arms will be exactly alike, and it will be necessary to draw on the trip-wire $q^{11}$ every time it is desired to rake off, and thus there will be no automatic raking, but it will be wholly under the control of the driver, and may be as frequent or seldom as the accumulation of cut grain on the platform renders desirable.

Having thus described my invention, what I claim as new, and desire to secure by Letters Patent, is—

1. In a harvesting-machine, the combination, with the platform and rake, of the rake-post M, plate M′, having projection $m^2$, provided with the housing M², the yielding curved and bent rake-rail M³, having slots $m^3$ $m^3$ in its inner end, the bolts $m^4$ $m^4$, securing said rail within said housing, and the coiled springs M⁴ M⁴ around said bolts, and located, respectively, above and below said rail, substantially as set forth.

2. In a harvesting-machine, the combination, with the rake, of a plate on the rake-post, the trip-holder Q′, bolted thereto, and having curved guides $q^4$ $q^4$, ears $q^2$ $q^2$, and lug $q^{10}$, integral therewith, the bell-crank Q³, pivoted to said lug, and having pin $q^{12}$, the trip-wire $q^{11}$, connected to said pin, the shaft $q^3$, carried in said ears $q^2$ $q^2$, the trip Q, having backward-extending arms $q$ $q$, provided with the slot $q^5$, to receive the ends of the shaft $q^3$, nipples $q^6$ $q^6$, adapted to slide between the guides $q^4$ $q^4$, and rear connecting-plate, $q^7$, having nipple $q^8$, under corresponding nipple, $q^9$, on the under side of the rake-post plate, and the spring Q², all combined and adapted to operate substantially as set forth.

3. In a self-raking harvesting-machine, the combination, with the rake-post, the plate M′, trip Q, rake-wheel O, and attachments, of the shank R R′, having groove $r^4$, the spring R², rake-arm V, sleeve S, provided with the housing S′, dog T′, having shank $t′$, projections $t^2$ $t^3$, recess $t^4$, having vertical beveled or dovetailed groove $t^5$, the sliding dog-block T³, provided with the mortise $t^8$, the pivoted thumb-piece $T^2$, provided with the pin $t^7$, and the spring $t^6$, all combined and adapted to operate substantially as set forth.

4. In a harvesting-machine, the combination of the platform and rake with the rake-post M, plate M', rake-rail $M^3$, rake-guide $M^5$, trip Q, pinion N', bevel rake-wheel O, provided with flange or collar $o'$ and ears $o^2$, cam or cap P, the rake-arm shanks R R', pivoted to the ears $o^2$, and having lugs $r^2$, stops $r^3$, grooves $r^4$, and springs $R^2$, the links $R^4$, sleeves S, provided with projecting plates connected to the rakes, and housings S', carrying the trip-dogs, all combined and adapted to operate substantially as set forth.

5. In combination with a harvester rake-trip, the movable dog T', having shank $t'$, projections $t^2$ $t^3$, recess $t^4$, with vertical beveled or dovetailed grooves $t^5$, sliding dog-block $T^3$, with mortise $t^8$, pivoted thumb-piece $T^2$, with pin $t^7$, and spring $t^6$, all combined and adapted to operate substantially as set forth.

In testimony that I claim the foregoing I have hereunto set my hand on this 8th day of March, 1883, in the presence of two witnesses.

MARSE VAN MATTESON.

Witnesses:
H. G. UNDERWOOD,
ADOLPH KLEIN.